United States Patent
Paroni et al.

(10) Patent No.: US 9,752,746 B2
(45) Date of Patent: Sep. 5, 2017

(54) AUTOMOTIVE LIGHT

(71) Applicant: AUTOMOTIVE LIGHTING ITALIA S.p.A., Venaria Reale (IT)

(72) Inventors: Sara Paroni, Codroipo (IT); Pietro Rainis, Tolmezzo (IT)

(73) Assignee: Automotive Lighting Italia S.p.A., Venaria Reale (IT)

( * ) Notice: Subject to any disclaimer, the term of this patent is extended or adjusted under 35 U.S.C. 154(b) by 268 days.

(21) Appl. No.: 14/459,694

(22) Filed: Aug. 14, 2014

(65) Prior Publication Data
US 2015/0049503 A1   Feb. 19, 2015

(30) Foreign Application Priority Data
Aug. 19, 2013   (IT) ............................. TV2013A0134

(51) Int. Cl.
F21S 8/10   (2006.01)
F21Y 115/10   (2016.01)

(52) U.S. Cl.
CPC ......... *F21S 48/2281* (2013.01); *F21S 48/215* (2013.01); *F21S 48/2243* (2013.01); *F21S 48/2262* (2013.01); *F21Y 2115/10* (2016.08)

(58) Field of Classification Search
CPC .. F21S 48/2281; F21S 48/2243; F21S 48/215; F21S 48/2262
See application file for complete search history.

(56) References Cited

U.S. PATENT DOCUMENTS

| 4,868,719 A | 9/1989 | Kouchi et al. |
| 5,642,933 A * | 7/1997 | Hitora ............ F21S 8/083 362/243 |
| 2008/0013333 A1 | 1/2008 | Koizumi et al. |
| 2011/0260616 A1 | 10/2011 | Chaterlea et al. |

(Continued)

FOREIGN PATENT DOCUMENTS

| DE | 102006059980 | 6/2008 |
| DE | 102011103179 | 12/2012 |

(Continued)

OTHER PUBLICATIONS

Italian Search Report and Written Opinion dated Mar. 6, 2014.

*Primary Examiner* — Anh Mai
*Assistant Examiner* — Zachary J Snyder
(74) *Attorney, Agent, or Firm* — McCarter & English, LLP (57) ABSTRACT

An automotive light includes a substantially basin-shaped rear body; a front lenticular half-shell arranged to close the mouth of the rear body and includes a ribbon-like, transparent or semitransparent portion; and a first lighting assembly structured to emit light when electricity powered, and arranged within the rear body to backlight the ribbon-like portion of the front lenticular half-shell. The first lighting assembly includes a light-guide plate made of light-conducting material and a linear-extending light source within the rear body next to the light-guide plate, and structured to direct emitted light towards the inside of the light-guide plate. The linear-extending light source includes a row of light-emitting diodes which face the light-guide plate and are placed spaced side-by-side to one another, and a power-supply and control circuit which sequentially turns on the diodes so as to illuminate in sequence an equal number of segments of the light-guide plate.

18 Claims, 4 Drawing Sheets

(56) References Cited

U.S. PATENT DOCUMENTS

| | | |
|---|---|---|
| 2012/0033441 A1 | 2/2012 | Sousek et al. |
| 2012/0081915 A1* | 4/2012 | Foote .................. B60R 1/12 362/494 |
| 2013/0021815 A1* | 1/2013 | Koizumi .............. F21S 48/215 362/511 |
| 2013/0127612 A1 | 5/2013 | Stadler et al. |

FOREIGN PATENT DOCUMENTS

| | | | |
|---|---|---|---|
| EP | 2354637 | 8/2011 | |
| EP | 2481635 A1 * | 8/2012 | ............ B60Q 1/26 |
| EP | 2548769 A1 * | 1/2013 | ............ B60Q 1/26 |
| JP | 2007280689 | 10/2007 | |

* cited by examiner

Fig. 4 ent invention relates to an automotive light.
AUTOMOTIVE LIGHT

TECHNICAL FIELD

The present invention relates to an automotive light.

More in detail, the present invention relates to an automotive rear light, use to which the following description will make explicit reference without this implying any loss of generality.

BACKGROUND OF THE INVENTION

As is known, rear lights of automobiles are usually made up of: a rigid rear body, which is substantially basin-shaped and is structured in so as to be stably recessed within a compartment specifically provided in the rear part of the vehicle body; a front lenticular half-shell, which is at least partially made of transparent or semitransparent plastic material, usually also coloured, and is arranged to close the mouth of the rear body so as to surface on the outside of the vehicle body; one or more incandescence light bulbs, each of which is located close to the bottom of the rear body more or less aligned with a corresponding transparent or semitransparent portion of the front lenticular half-shell so to be able to backlight the same transparent or semitransparent portion the half-shell; and one or more reflecting bodies having a roughly parabolic profile and being each fitted on a corresponding incandescence light bulb so as to be able to direct all the light produced by the light bulb towards the superjacent transparent or semitransparent portion of the front lenticular half-shell.

In some models of automotive rear light, moreover, the front lenticular half-shell is also provided with a long transparent or semitransparent ribbon-like portion, which usually extends parallel to the ground; and the automotive light is provided with a row of incandescence light bulbs which are aligned one side by side the other underneath the entire transparent or semitransparent ribbon-like portion so that each of them is able to backlight a respective sector of the transparent or semitransparent ribbon-like portion.

Light bulbs located underneath the transparent or semitransparent ribbon-like portion are usually turned on in sequence so as to create, on the front lenticular half-shell, a small luminous area/zone that displaces/moves along the front lenticular half-shell in a direction parallel to the ground. This mobile light signal is generally used as turning indicator of the vehicle.

In the course of the last few years, some manufacturers of automotive lights decided to replace the row of incandescence light bulbs with a long row of light-emitting diodes (LEDs) located immediately underneath the transparent or semitransparent ribbon-like portion, throughout the length of the ribbon-like portion.

Unfortunately, LEDs are point-type light sources thus a large number of LEDs is necessary to be able to backlight adequately the entire transparent or semitransparent ribbon-like portion of the front lenticular half-shell. The distribution of the LEDs, in fact, must be such as to produce a particularly intense light signal which is capable to match the photometric specifications envisaged for type-approval of motor vehicles direction lights, and which moreover has a light intensity as uniform as possible throughout the length of the transparent or semitransparent ribbon-like portion of the half-shell, thus to meet the aesthetic requirements of manufacturers of automobiles, motor cycles, and the like.

Obviously, the large number of LEDs required has caused a significant rise in the overall production costs of automotive lights, with all the problems that this entails.

SUMMARY OF THE INVENTION

Aim of the present invention is to provide automotive rear lights with mobile-light type, direction indicators capable to overcome the limitations of LED backlight systems.

In compliance with the above aims, according to the present invention there is provided an automotive light that may advantageously include a substantially basin-shaped rear body structured so to be fixed onto the vehicle body; a front lenticular half-shell which is arranged to close the mouth of the rear body, and is provided with at least one ribbon-like, transparent or semitransparent portion; and at least a first lighting assembly which is structured so as to emit light when electricity powered, and is arranged within the rear body so as to backlight the ribbon-like, transparent or semitransparent portion of the front lenticular half-shell. The automotive light may also advantageously be characterized in that said first lighting assembly includes a light-guide plate made of light-conducting material and which extends substantially from the bottom of the rear body up to and close the front lenticular half-shell, to arrange a front side edge of the same light-guide plate faced to said ribbon-like, transparent or semitransparent portion; and a linear-extending light source which is located within the rear body next to the light-guide plate, and is structured so as to direct the emitted light towards the inside of the light-guide plate; in that the linear-extending light source includes a row of light-emitting diodes which face the light-guide plate and are arranged spaced side-by-side to one another, and a power-supply and control circuit which is able to sequentially turn on said diodes, so as to illuminate in sequence an equal number of segments of the light-guide plate; and in that the light-guide plate is also provided with longitudinal diverging optics which extends along the front side edge of the light-guide plate, and is structured so as to scatter the light rays (r) coming out from the front side edge of the light-guide plate.

Additional advantageous features and functions of the disclosed invention will be apparent from the detailed description which follows, particularly when read in conjunction with the accompanying figures.

BRIEF DESCRIPTION OF THE DRAWINGS

The present invention will now be described with reference to the annexed drawings, which illustrate a non-limiting example of embodiment thereof and in which.

DETAILED DESCRIPTION OF THE INVENTION

Figure 1:
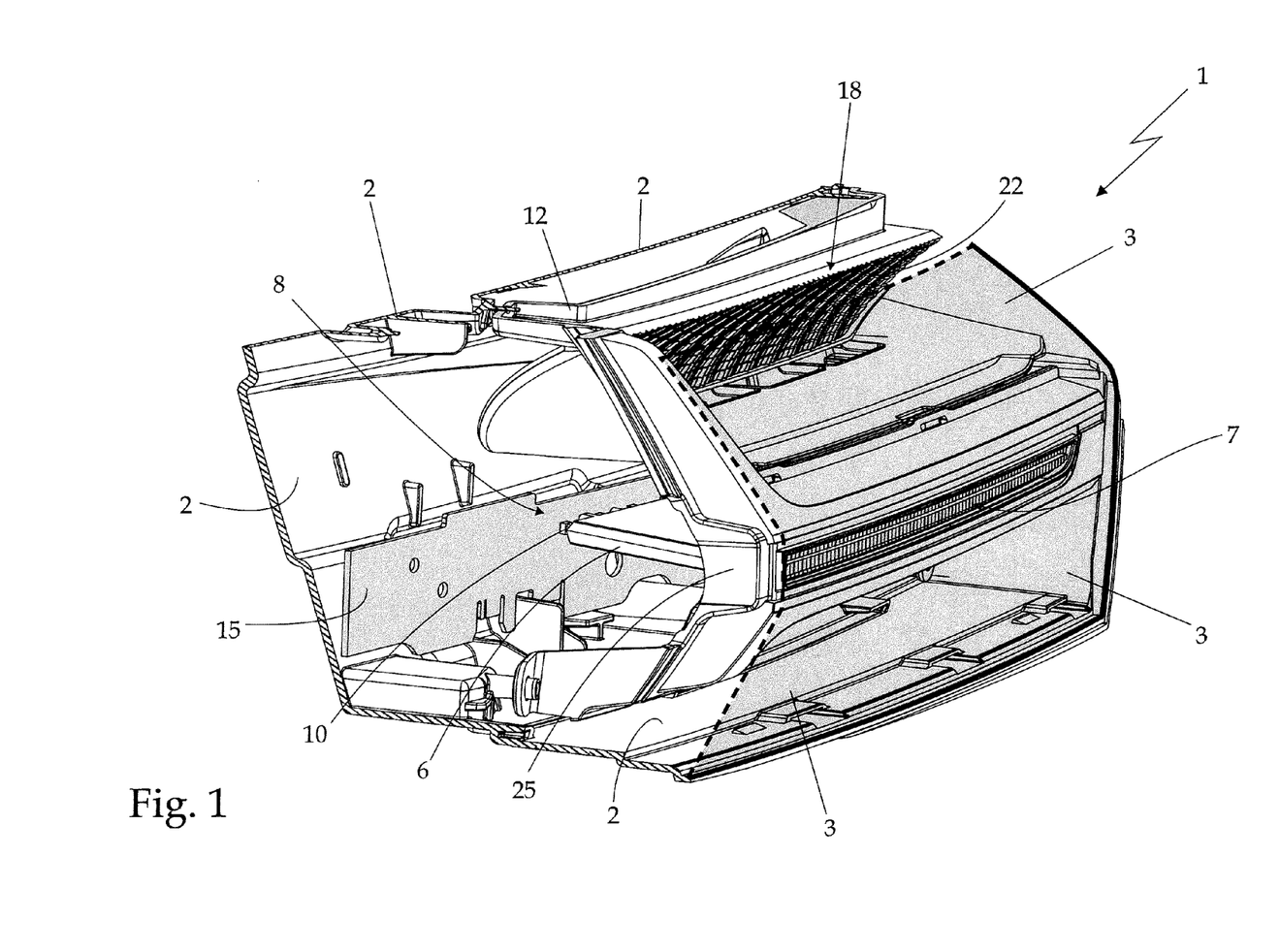
FIG. 1 is an axonometric view of an automotive rear light realized according to the teachings of the present invention, with parts in section and parts removed for clarity.
Figure 2:
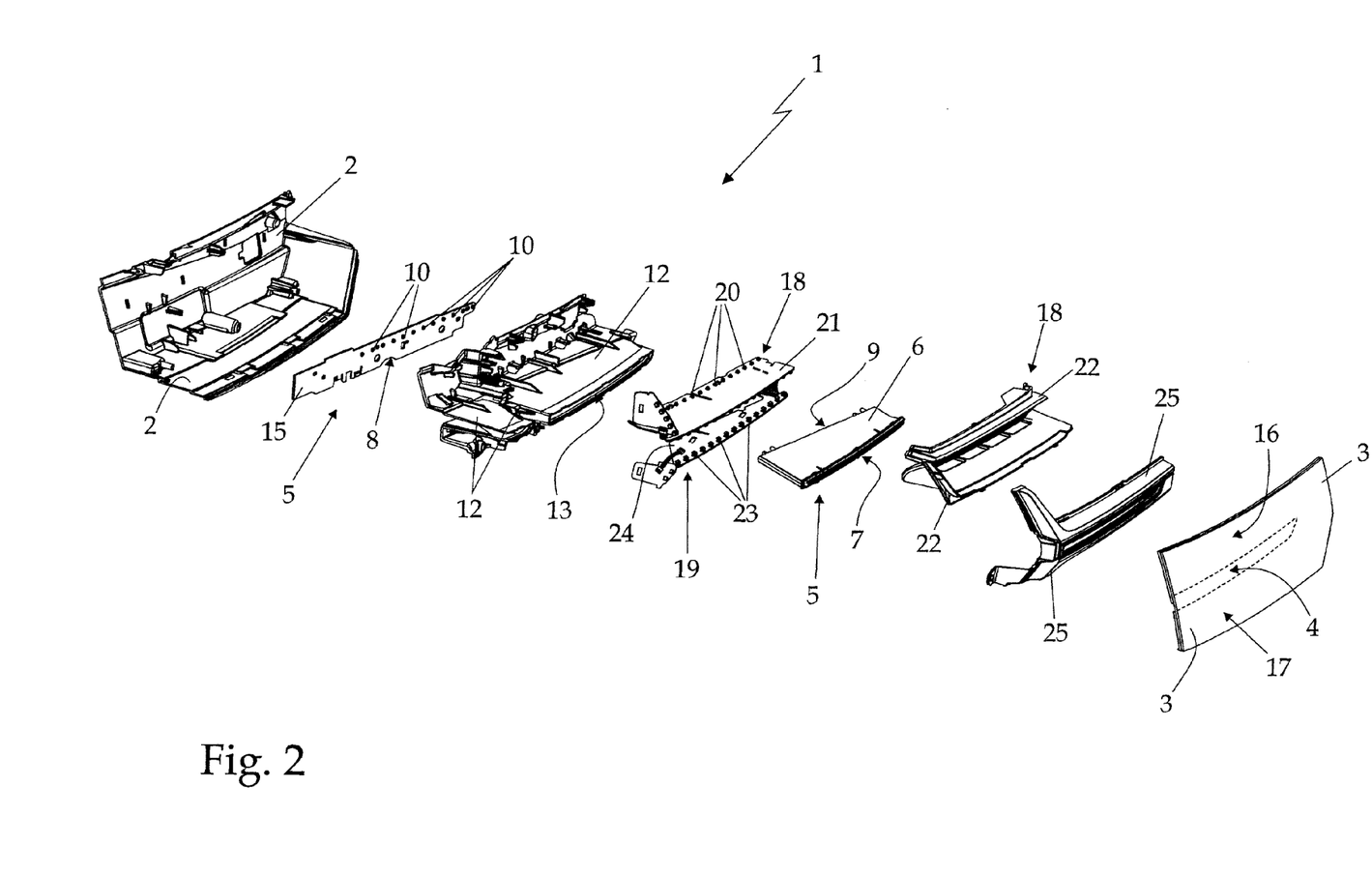
FIG. 2 is an exploded perspective view of the automotive light shown in FIG. 1.

With reference to FIGS. 1 and 2, number 1 designates as a whole an automotive light particularly suited for being fixed preferably on the rear part of the vehicle body of an automobile, motor cycle, or the like, i.e. an automotive rear light. More in detail, the automotive light 1 is preferably, though not necessarily, structured so as to be fixed on the rear part of the vehicle body of an automobile, motor cycle, or similar vehicle, and basically comprises:

- a rigid rear body 2 which is substantially basin-shaped and is moreover preferably structured so as to be recessed within a compartment (not shown) specifically provided in the rear part of the vehicle body (not shown);
- a front lenticular half-shell 3, which is arranged to close the mouth of the rear body 2, preferably, though not necessarily, in such a way that it can simultaneously surface on the outside of the vehicle body (not shown), and is provided with one or more transparent or semitransparent portions, which are possibly also coloured; and
- one or more lighting assemblies, each of which is structured so as to emit light when electricity powered and is located within the rear body 2 in a position such as to be able to backlight a corresponding transparent or semitransparent portion of the front lenticular half-shell 3.

At least one of the transparent or semitransparent portions of the front lenticular half-shell 3, hereinafter designated by the reference number 4, is moreover substantially ribbon-like (i.e. it has a narrow and elongated shape), and is preferably arranged on the front lenticular half-shell 3 so as to be substantially horizontal when the automotive light 1 occupies the corresponding compartment in the rear part of the vehicle body.

Obviously, automotive light 1 could also be structured so as to be fixed on the front part of the vehicle body of an automobile, motor cycle, or the like, i.e. it may be a headlight. In other words, the rear body 2 could be structured for being recessed within a compartment (not shown) specifically provided in the front part of the vehicle body (not shown).

In the example shown, in particular, rear body 2 is preferably made of an opaque plastic material, and is preferably formed via an injection-moulding process. The front lenticular half-shell 3, on the other hand, is preferably made of a transparent or semitransparent plastic material, such as, for example, polycarbonate or transparent or semitransparent polymethyl methacrylate, also in this case preferably via an injection-moulding process.

Obviously, in a different embodiment, rear body 2 may also be structured so as to be simply fixed cantilevered on the rear part of the vehicle body (not shown).

With reference to FIGS. 1, 2, 3, and 4, the lighting assembly designed to backlight the transparent or semitransparent ribbon-like portion 4, hereinafter designated by reference number 5, is located inside the rear body 2 immediately underneath the transparent or semitransparent ribbon-like portion 4, and basically comprises: a light-guide plate 6 made of light-conducting material and which extends roughly from the bottom of rear body 2 up to and close the lenticular half-shell 3, arranging its own front side edge 7 faced to the transparent or semitransparent ribbon-like portion 4 of lenticular half-shell 3, preferably substantially along the whole length of the ribbon-like portion 4; and a linear-extending light source 8 which is located inside the rear body 2, substantially close to the bottom of rear body 2, in abutment against, or in any case facing, the rear side edge 9 of light-guide plate 6 preferably substantially along the whole length of the rear side edge 9, and is structured so as to direct the emitted light towards the inside of light-guide plate 6 through the same rear side edge 9. Light that afterwards travels within the body of light-guide plate 6 by virtue of the same physical principles that govern propagation of light within optical-fibre cables, and exits from the light-guide plate 5 through the front side edge 7.

More in detail, the linear-extending light source 8 comprises a row or string of light-emitting diodes 10, traditionally called LEDs, which are arranged spaced one side by side another in abutment on, or in any case facing, the rear side edge 9 of light-guide plate 6, and are oriented so as to direct the emitted light towards the inside of the light-guide plate 6 through the same rear side edge 9; and a power-supply and control circuit (not shown), which is able to sequentially turn on the diodes 10 so as to light up in succession as many segments of the rear side edge 9 of light-guide plate 6.

In other words, the power-supply and control circuit (not shown) is structured so as to be able to turn on in succession the individual diodes 10 of the row of light-emitting diodes 10 one after another, starting from one end of the row of diodes 10 and turning on each diode 10 with a given delay (for example 0.5 seconds) with respect to turning-on of the immediately adjacent and previous diode 10. In addition, the power-supply and control circuit (not shown) is also structured in so as to turn off each diode 10 of the row of light-emitting diodes 10 immediately after the immediately adjacent and subsequent diode 10 has been turned on.

Alternatively, the power-supply and control circuit (not shown) may be structured so as to turn off simultaneously all the diodes 10 of the row of light-emitting diodes 10, with a given delay (for example 0.5 seconds) with respect to turning-on of the last diode 10 of the row of light-emitting diodes 10.

In a different embodiment, the power-supply and control circuit (not shown) could be structured so as to turn on in succession groups of diodes 10 (for example three adjacent diodes 10) of the row of light-emitting diodes 10 one after another, starting from one end of the row of diodes 10 and turning on each group of diodes with a given delay (for example 0.5 seconds) with respect to turning-on of the immediately adjacent and previous group of diodes 10. In addition, the power-supply and control circuit (not shown) may also be structured so as to turn off each group of diodes 10 of the row of light-emitting diodes 10 immediately after turning-on of the immediately adjacent and subsequent set of diodes 10.

Also in this second embodiment, as an alternative, the power-supply and control circuit (not shown) could be structured so as to turn off simultaneously all the groups of diodes 10 of the row of light-emitting diodes 10, with a given delay (for example 0.5 seconds) with respect to turning-on of the last group of diodes 10 of the row of light-emitting diodes 10.

With reference to FIGS. 1, 2, 3, and 4, the light-guide plate 6, on the other hand, has a thickness preferably substantially equal to the width of the transparent or semitransparent ribbon-like portion 4 of front lenticular half-shell 3, and extends within the rear body 2, roughly from the bottom of rear body 2 up to the front lenticular half-shell 3, remaining locally substantially perpendicular to the front lenticular half-shell 3.

More in detail, in the example shown, automotive light 1 is preferably, though not necessarily, provided with an internal supporting member 12 which is structured to be slotted into the rear body 2, underneath the front lenticular half-shell 3, and the light-guide plate 6 is fitted/inserted in pass-through manner into a rectilinear slit or a plate-like tubular sheath 13 provided in the internal supporting member 12.

Figure 3:
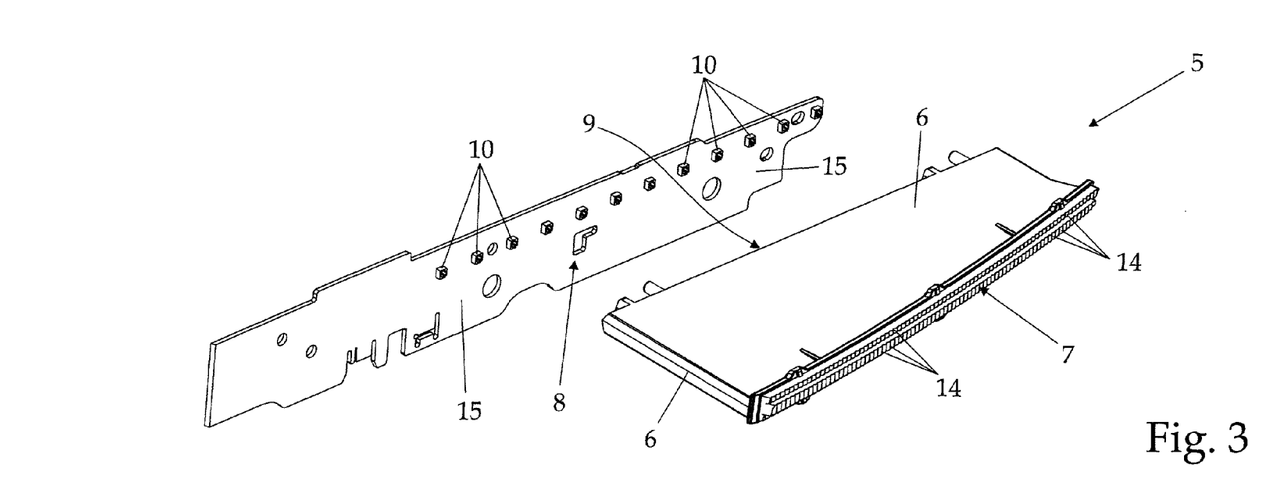
FIG. 3 is an exploded perspective view of part of the automotive light shown in FIGS. 1 and 2.
Figure 4:
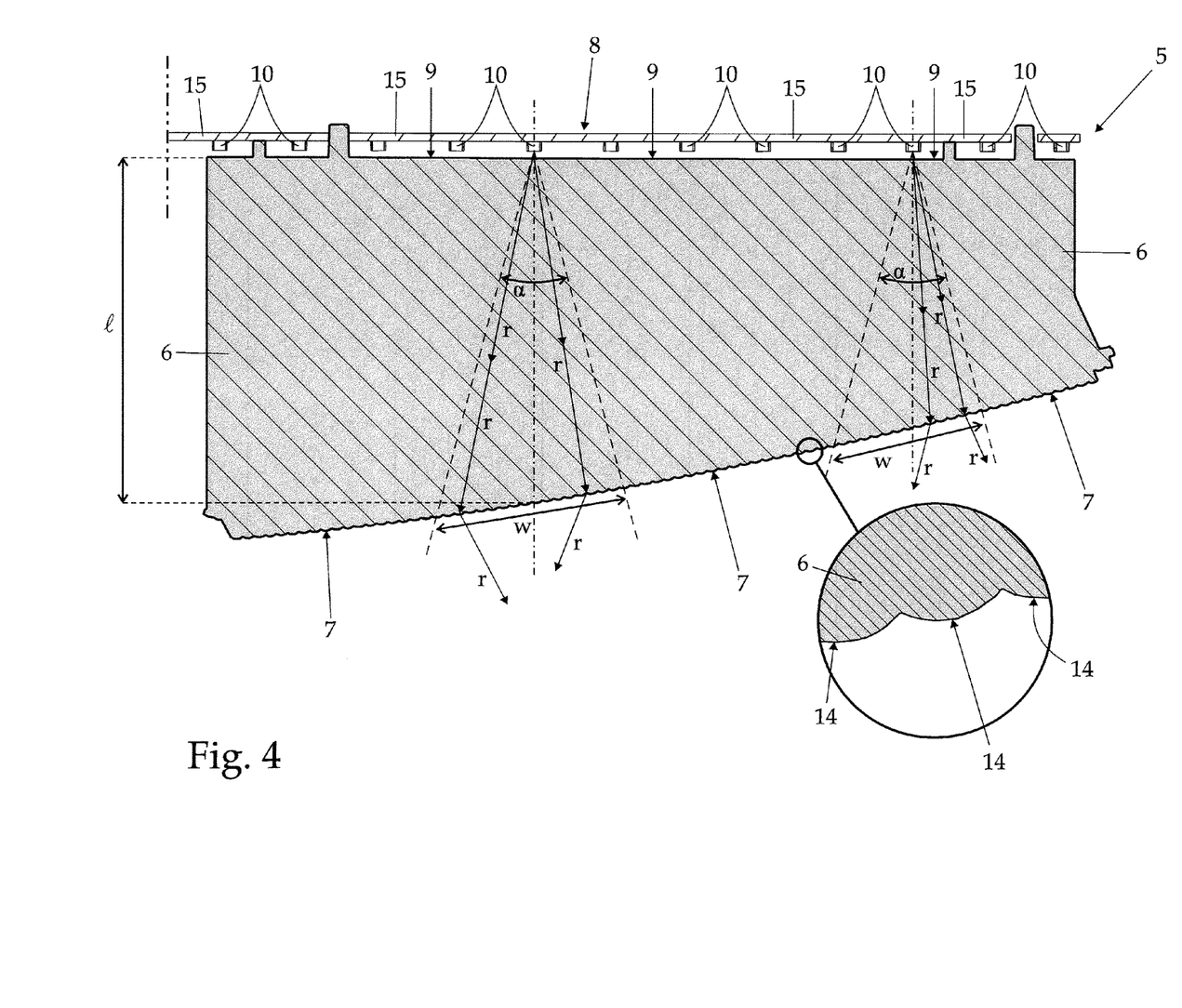
FIG. 4 is a cross-sectional view of the part of light shown in FIG. 3.

With reference to FIGS. 3 and 4, the front side edge 7 of light-guide plate 6 is moreover preferably profiled so as to remain locally substantially tangential to the transparent or semitransparent ribbon-like portion 4 of lenticular half-shell 3, preferably substantially throughout the whole length of the same ribbon-like portion 4.

In addition to the above, the front side edge 7 of light-guide plate 6 is lastly provided with a longitudinal diverging optics 14 preferably having a substantially cylindrical geometry, which extends along the front side edge 7 of light-guide plate 6, preferably on the laying plane of the light-guide plate 6 and preferably also without interruption substantially throughout the whole length of the front side edge 7, and is structured in so as to scatter the light rays r coming out from the front side edge 7 of light-guide plate 6.

In the example shown, in particular, the front side edge 7 of light-guide plate 6 is preferably provided with at least one row/succession of lenticular ridges 14 with substantially cylindrical geometry, which are arranged parallel and adjacent to one another along the front side edge 7, preferably on the laying plane of light-guide plate 6 and preferably without interruption substantially throughout the whole length of the front side edge 7 so as to form, on front side edge 7 of light-guide plate 6, a longitudinal diverging optics with substantially cylindrical geometry.

Preferably, the generatrix or generatrices of the lenticular ridges 14 is/are moreover substantially perpendicular, or in any case inclined by a given angle (for example 60°) with respect to the laying plane of light-guide plate 6, so as to form, on the front side edge 7 of light-guide plate 6, a longitudinal diverging optics with a substantially cylindrical geometry, having the generatrix or generatrices locally substantially perpendicular, or in any case inclined by a given angle (for example 60°), with respect to the laying plane of light-guide plate 6.

In the example shown, in particular, the pitch or centre spacing between two adjacent lenticular projections with cylindrical geometry 14 preferably, though not necessarily, ranges between 0.01 and 3 mm, while the radius of curvature of the cylindrical profile of each lenticular projection 14 is preferably less than twice the value of the pitch or centre-spacing between two lenticular ridges 14.

With reference to FIG. 4, the rear side edge 9 of light-guide plate 6 instead has a continuous linear profile, i.e. without any splits, notches, or other discontinuities extending into the body of light-guide plate 6, which is preferably also substantially rectilinear.

In the example shown, lastly the light-guide plate 6 is preferably, though not necessarily, made of Plexiglas, transparent polycarbonate, or other similar plastic material, preferably via an injection-moulding process.

With reference to FIGS. 1, 2, 3, and 4, the diodes 10 of the linear-extending light source 8 are instead preferably located, at a given distance from one another, on a same oblong-shaped supporting board 15 which is preferably fixed directly on the bottom of rear body 2 so as to arrange/place the individual diodes 10 in abutment on, or in any case faced to, as many segments of the rear side edge 9 of light-guide plate 6, so that each diode 10 can orient/direct the emitted light towards the inside of the light-guide plate 6 through the same rear side edge 9.

Preferably, though not necessarily, the supporting board 15 moreover accommodates also the power-supply and control circuit (not shown) of the linear-extending light source 8, which is designed to turn on the diodes 10 sequentially.

In addition, each diode 10 is preferably structured so that the majority of the emitted light is concentrated in a cone of light having a maximum aperture less than or equal to 30°.

Preferably, though not necessarily, the linear-extending light source 8 finally comprises, for each diode 10, an intermediate collimating member (not shown), which is placed in front of the diode 10 and is structured to reduce the vector component of the light rays r coming out of diode 10 that is oriented orthogonally to the laying plane of light-guide plate 6.

In other words, the intermediate collimating member (not shown) is structured to squeeze the cone of light produced by diode 10 in a direction orthogonal to the laying plane of the light-guide plate 6.

With reference to FIGS. 1 and 2, in the example shown, moreover, the front lenticular half-shell 3 is preferably also provided with at least one second transparent or semitransparent portion, which is positioned alongside the transparent or semitransparent ribbon-like portion 4; and the automotive light 1 is provided with a corresponding lighting assembly, which is located inside the rear body 2 and is structured so as to be able to backlight said second transparent or semitransparent portion.

More in detail, in the example shown, the front lenticular half-shell 3 is preferably, though not necessarily, provided with another two transparent or semitransparent portions 16 and 17, which are arranged on opposite sides of the transparent or semitransparent ribbon-like portion 4; whereas automotive light 1 is provided with two further lighting assemblies 18 and 19, which are both located inside the rear body 2 and are structured as to be able to backlight, respectively, the transparent or semitransparent portion 16 and the transparent or semitransparent portion 17 of the front lenticular half-shell 3.

In the example shown, in particular, the lighting assembly 18 preferably comprises a row or string of light-emitting diodes 20, traditionally called LEDs, which are arranged spaced one side by side another, on a second supporting board 21 which preferably also accommodates the circuit for power-supply and control of the same diodes 20, and is preferably fixed directly on the internal supporting member 12, above the light-guide plate 6; and a reflecting body 22 preferably, though not necessarily, having a roughly parabolic profile, which is arranged inside the rear body 2 optically aligned both with the transparent or semitransparent portion 16 and with the row or string of light-emitting diodes 20, is preferably fixed directly on the internal supporting member 12 above the row or string of light-emitting diodes 20, and is finally structured to reflect/direct the light emitted by the diodes 20 towards the transparent or semitransparent portion 16 of the front lenticular half-shell 3.

The lighting assembly 19, instead, preferably comprises a row or string of light-emitting diodes 23, traditionally called LEDs, which are arranged spaced one side by side another on a third supporting board 24, which preferably accommodates also the circuit for power-supply and control of the same diodes 23, and is preferably fixed directly on the internal supporting member 12, underneath the light-guide plate 6, so as to face the transparent or semitransparent portion 17, thus to directly backlight the transparent or semitransparent portion 17 of front lenticular half-shell 3.

With reference to FIGS. 1 and 2, preferably the automotive light 1 finally comprises a covering mask 25 preferably made of opaque material, which is located immediately underneath the front lenticular half-shell 3 and is structured to hide from view the internal supporting member 12 and the boards 15, 21, and 24 of the lighting assemblies 5, 18 and 19.

General operation of automotive light 1 is easily inferable from the above, and does not require further explanations.

As regards, instead, the lighting assembly 5, the particular structure of light-guide plate 6 enables each diode 10 to produce, on front side edge 7 of light-guide plate 6, a light segment with nominal width w, which, in turn, is able to backlight a corresponding sector of the transparent or semi-transparent ribbon-like portion 4 of front lenticular half-shell 3. Sequential turning-on of the row of diodes 10 is consequently able to produce, on the front lenticular half-shell 3, a small luminous area/zone that displaces/moves along the front lenticular half-shell 3 in a direction parallel to the ground, with the modalities envisaged for the direction lights of a vehicle.

In the case of lighting assembly 5, however, the nominal width w of the light segment that forms on the front side edge 7 of light-guide plate 6 is correlated to the characteristics of the light-guide plate 6 and of the diode 10 by the following formula:

$$w = 2 \cdot l \cdot \tan \alpha/2;$$

wherein obviously w is the nominal width of the light segment on front side edge 7 of light-guide plate 6; l is the width of the light-guide plate 6 in an area corresponding to the diode 10; and finally $\alpha$ is the aperture of the cone of light generated by diode 10, in which the light rays r reach the front side edge 7 with an angle of incidence less than the limit angle, and can therefore come out from the light-guide plate 6. In turn, the maximum value of the aperture $\alpha$ of the cone of light that can be used to form the luminous segment on the front side edge 7 of light-guide plate 6 depends upon the geometrical characteristics of the longitudinal diverging optics 14 located on the front side edge 7 of light-guide plate 6.

Obviously, the aperture of the cone of light generated by the diode 10 must be greater than or equal to the aperture $\alpha$ of the cone of light that can be used to form of the luminous segment on the front side edge 7 of light-guide plate 6.

By appropriately spacing apart the diodes 10 on the rear side edge 9 of light-guide plate 6, it is thus possible to form, on the front side edge 7 of light-guide plate 6, a succession of contiguous and consecutive luminous segments having a nominal width w that is preferably substantially constant; whereas the longitudinal diverging optics 14 present on the front side edge 7 of light-guide plate 6 allows to eliminate/minimize the effects of concentration of light typical of point-like light sources such as LEDs.

In addition, the continuous linear profile of the rear side edge 9 of light-guide plate 6 prevents sequential turning-on of the individual diodes 10 from producing unsightly shadings on the luminous segment formed on the front side edge 7 of light-guide plate 6.

The choice of using diodes 10 able to produce a cone of light having a maximum aperture substantially coinciding with the maximum aperture $\alpha$ of the cone of light that enables to form the luminous segment with nominal width w on the front side edge 7 of light-guide plate 6, allows, instead, to minimize the number of light rays r that, traversing the body of light-guide plate 6, impinge upon the front side edge 7 of light-guide plate 6 with an angle of incidence greater than the limit angle and are then reflected again towards the rear side edge 9 of light-guide plate 6.

Finally, tests have shown that, if the aperture $\alpha$ of the usable cone of light exceeds 30°, the reflected component of the light rays coming out of front side edge 7 of light-guide plate 6 tends to be preponderant with respect to the refracted component, rendering lighting-up of the two ends of the lighting segment far from efficient. Consequently, use of diodes 10 structured to produce a cone of light having an aperture less than or equal to 30° enables optimization of lighting-up of the luminous segments.

The advantages linked to the particular structure of the lighting assembly 4 are considerable.

The combined use of the light-guide plate 6 and of the light-emitting diodes 10, appropriately spaced apart on the rear side edge 9 of light-guide plate 6, enables creation, on the front lenticular half-shell 3, of a small luminous area/zone that is particularly homogeneous and bright and is able to displace/move along the front lenticular half-shell 3 in a direction parallel to the ground, using a small number of light-emitting diodes 10, with all the economic advantages that derive therefrom.

Finally, it is clear that modifications and variations may be made to the automotive light 1 described above, without thereby departing from the scope of the present invention.

For example, the diodes 20 and 23 of the two lighting assemblies 18 and 19 could be replaced by traditional incandescence light bulbs for automotive use.

Figure 5:
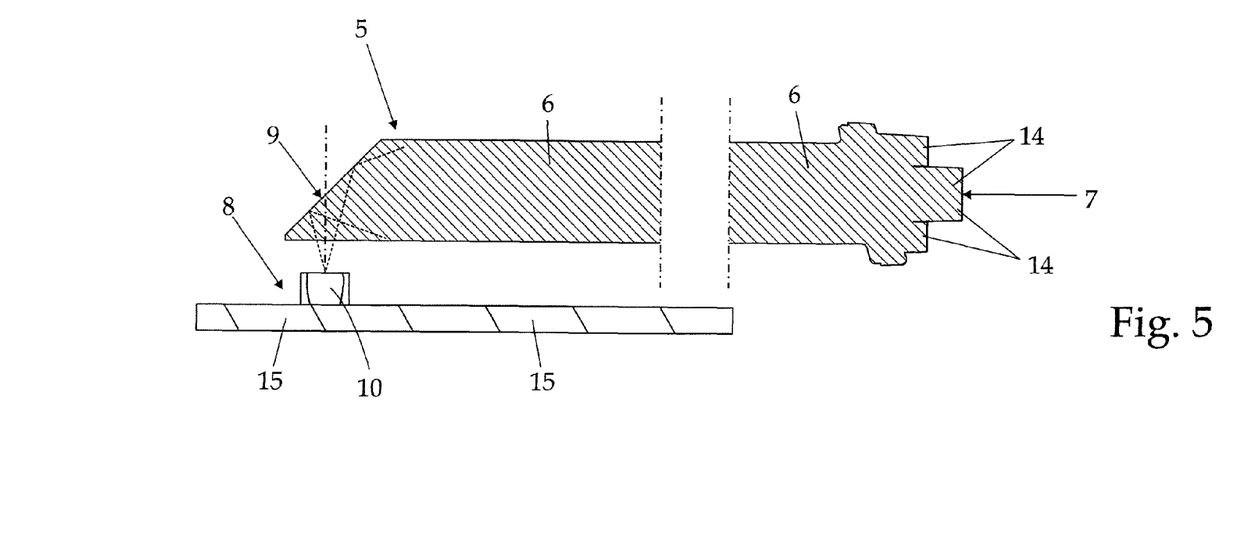
FIG. 5 is a cross-sectional view of a different embodiment of the part of light shown in FIG. 3.

With reference to FIG. 5, in a different embodiment of lighting assembly 5, the linear-extending light source 8 is located inside the rear body 2 so as to face one of the two major faces of the light-guide plate 6, close to the rear side edge 9 of light-guide plate 6, and is structured to direct the emitted light within the light-guide plate 6, towards the rear side edge 9 of light-guide plate 6, through the face of the same light-guide plate 6. The rear side edge 9 of light-guide plate 6, in turn, is shaped so to deflect/reflect the incident light arriving from the linear-extending light source 8 towards the front side edge 7 of light-guide plate 6, exploiting the same physical principles that govern propagation of light within optical-fibre cables.

In other words, the linear-extending light source 8 comprises: a row or string of light-emitting diodes 10, traditionally called LEDs, which are arranged spaced one side by side another in abutment on, or in any case facing, one of the two major faces of the light-guide plate 6, close to the rear side edge 9 of light-guide plate 6, and are oriented so as to direct the emitted light within the light-guide plate 6 towards the rear side edge 9 of light-guide plate 6, through the major face of the light-guide plate 6; and a power-supply and control circuit (not shown) which is able to turn on the diodes 10 sequentially so as to light up in succession as many segments of the ribbon-like portion of the major face of the light-guide plate 6 that is adjacent to the rear side edge 9 of the same light-guide plate 6.

Moreover in a less sophisticated embodiment (not shown), instead of being formed by one or more rows/successions of lenticular projections with a substantially cylindrical geometry, the longitudinal diverging optics 14 may be obtained by appropriately embossing, frosting, or grinding the front side edge 7 of light-guide plate 6, or by applying a layer of opalescent material on the front side edge 7 of light-guide plate 6.

The invention claimed is:

1. An automotive light (1) comprising a rear body (2) structured so to be fixed onto the vehicle body; a front lenticular half-shell (3) which is arranged to close the mouth (2a) of the rear body (2), and is provided with at least one transparent or semitransparent ribbon-shaped portion (4); and at least a first lighting assembly (5) which is structured so as to emit light when electricity powered, and is arranged within the rear body (2) so as to backlight the transparent or semitransparent ribbon-shaped portion (4) of the front lenticular half-shell (3);

the automotive light (1) being characterized in that said first lighting assembly (5) comprises a light-guide plate (6) made of light-conducting material and which extends substantially from the bottom of the rear body (2) up to and close to the front lenticular half-shell (3), to arrange a front side edge (7) of the same light-guide plate (6) faced to said transparent or semitransparent ribbon-shaped portion (4); and a linear-extending light source (8) which is located within the rear body (2) next to the light-guide plate (6), and is structured so as to direct the emitted light towards the inside of the light-guide plate (6); in that the linear-extending light source (8) comprises a row of light-emitting diodes (10) which face the light-guide plate (6) and are arranged spaced side-by-side to one another, and a power-supply and control circuit which is able to sequentially turn on said diodes (10), so as to illuminate in sequence an equal number of segments of the light-guide plate (6); and in that the light-guide plate (6) is also provided with longitudinal diverging optics (14) which extends along the front side edge (7) of the light-guide plate (6), and is structured so as to scatter the light rays (r) coming out from the front side edge (7) of the light-guide plate (6).

2. An automotive light according to claim 1, characterized in that the light-emitting diodes (10) of the linear-extending light source (8) face a rear side edge (9) of the light-guide plate (6) spaced one beside the other, or face one of the two faces of the light-guide plate (6), spaced one beside the other close to the rear side edge (9) of the light-guide plate (6).

3. An automotive light according to claim 1, characterized in that said longitudinal diverging optics (14) is a longitudinal diverging optics having a substantially cylindrical geometry, with the generatrix or generatrices inclined with respect to the plane of the light-guide plate (6).

4. An automotive light according to claim 3, characterized in that the generatrix or generatrices of said substantially cylindrical geometry, longitudinal diverging optics (14) are locally substantially perpendicular to the plane of the light-guide plate (6).

5. An automotive light according to claim 1, characterized in that said longitudinal diverging optics (14) extends along the front side edge (7) of the light-guide plate (6) without interruption substantially along the whole length of the front side edge (7).

6. An automotive light according to claim 3, characterized in that said longitudinal diverging optics (14) comprises at least one row/succession of lenticular ridges (14) with a substantially cylindrical geometry and with the generatrix locally substantially inclined with respect to the plane of the light-guide plate (6), which ridges are arranged parallel and adjacent to one another along the front side edge (7) of the light-guide plate (6); the pitch or centre-spacing between two adjacent lenticular ridges (14) preferably ranging from 0.01 to 3 millimeters.

7. An automotive light according to claim 1, characterized in that a rear side edge (9) of the light-guide plate (6) has a continuous linear profile.

8. An automotive light according to claim 7, characterized in that the rear side edge (9) of the light-guide plate (6) has a substantially rectilinear profile.

9. An automotive light according to claim 1, characterized in that the power-supply and control circuit is structured so as to sequentially turn on the single diodes (10) or groups of diodes (10) of the row of light-emitting diodes (10) one after the other.

10. An automotive light according claim 9, characterized in that the power-supply and control circuit is structured so as to sequentially turn on the single diodes (10) or groups of diodes (10) of the row of light-emitting diodes (10) one after the other, starting from one end of the row of light-emitting diodes (10) and turning on each diode (10) or group of diodes (10) with a predetermined delay with respect to the turning on of the adjacent, previous diode (10) or group of diodes (10).

11. An automotive light according to claim 9, characterized in that the power-supply and control circuit is structured so as to turn off each diode (10) or group of diodes (10) of the row of light-emitting diodes (10) immediately after the adjacent and subsequent diode (10) or group of diodes (10) has been turned on.

12. An automotive light according to claim 9, characterized in that the power-supply and control circuit is structured so as to simultaneously turn off all diodes (10) or groups of diodes (10) of the row of light-emitting diodes (10), with a given delay with respect to the turned on of the last diode (10) or group of diodes (10) of the row of light-emitting diodes (10).

13. An automotive light according to claim 1, characterized in that the front side edge (7) of the light-guide plate (6) is profiled so as to remain locally substantially tangent to the transparent or semitransparent ribbon-shaped portion (4) of the front lenticular half-shell (3), substantially over the whole length of the same transparent or semitransparent ribbon-shaped portion (4).

14. An automotive light according to claim 1, characterized in that the thickness of the light-guide plate (6) is substantially equal to the width of the transparent or semitransparent ribbon-shaped portion (4) of the front lenticular half-shell (3).

15. An automotive light according to claim 1, characterized in that the light-guide plate (6) extends into the rear body (2) while remaining substantially locally perpendicular to the front lenticular half-shell (3).

16. An automotive light according to claim 1, characterized by further comprising an internal supporting member (12) which is structured so as to be slotted into the rear body (2), underneath the front lenticular half-shell (3), and the light-guide plate (6) is inserted in a pass-through manner through said internal supporting member (12).

17. An automotive light according to claim 1, characterized in that each diode (10) of said linear-extending light source (8) is structured so as to generate a light cone having a maximum aperture smaller than or equal to 30°.

18. An automotive light according to claim 1, characterized in that the front lenticular half-shell (3) is furthermore provided with at least a second transparent or semitransparent portion (16, 17) positioned by the side of the transparent or semitransparent ribbon-shaped portion (4); and in that the automotive light (1) also comprises at least a second lighting assembly (18, 19) which is located within the rear body (2), and is structured so as to backlight said second transparent or semitransparent portion (16, 17).

* * * * *